Sept. 12, 1933.   C. H. GRANGER   1,926,806
SUSTAINING POWER SYNCHRONOUS ELECTRIC CLOCK
Filed June 28, 1932   4 Sheets-Sheet 1

Inventor
Charles H. Granger
by Seymour Earle & Nichols
Attys

Sept. 12, 1933.   C. H. GRANGER   1,926,806
SUSTAINING POWER SYNCHRONOUS ELECTRIC CLOCK
Filed June 28, 1932   4 Sheets-Sheet 4

UNITED STATES PATENT OFFICE 1,926,806

SUSTAINING-POWER SYNCHRONOUS ELECTRIC CLOCK

Charles H. Granger, Waterbury, Conn.

Application June 28, 1932. Serial No. 619,705

15 Claims. (Cl. 58—26)

This invention relates to improvement in synchronous electric clocks and other time-instruments, and relates in particular to that class of synchronous electric time-instruments in which, in addition to the usual synchronous motor, so-called "sustaining-power" means is provided for driving the mechanism during an interruption in the supply of current to the said synchronous motor. Such time-instruments are sometimes referred to as having "carry-over" movements, inasmuch as the sustaining-power feature serves to keep the instrument in operation during current interruptions.

The particular clock herein chosen as illustrative of my invention embodies several novel features, including a simple and reliable arrangement of parts whereby when a current interruption takes place, the sustaining-power feature is automatically relieved of the burden of driving the now unenergized motor.

In one of its phases, as will be seen from the following, an axial movement of the rotor of the motor itself is utilized to couple and uncouple the rotor from the sustaining-power feature.

A further feature to which attention may be called in the clock herein chosen for illustration, consists in a construction and arrangement of parts whereby the sustaining-power feature, instead of being cut out of action when the motor is actively engaged in driving the clock, is active substantially all of the time, but is positively governed by the synchronous motor.

As will be seen from the following, the drive-spring or equivalent energy-storing motor which is employed for propelling the mechanism during an interruption in the current supply is energized by the synchronous motor as the same is actively engaged in propelling or otherwise controlling the hands or other timing-element of the instrument.

Other features will appear from the following taken in connection with the accompanying drawings.

One of the main objects of my present invention is to provide a superior time-instrument capable of normally operating in synchronism with an alternating-current supply and also capable of continuing to operate when the current supply fails, and characterized by accuracy and reliability of operation.

Other objects will appear to those skilled in the art, from the following and from the accompanying drawings.

In the accompanying drawings:

Fig. 6 is a detail sectional view taken on the line 6—6 of Fig. 2;

Fig. 7 is a detail sectional view of the main-arbor, spring-barrel and associated parts taken on the line 7—7 of Fig. 1; and Fig. 8 is a view partly in side elevation and partly in central section of the third arbor, third wheel and associated parts.

Figure 1:
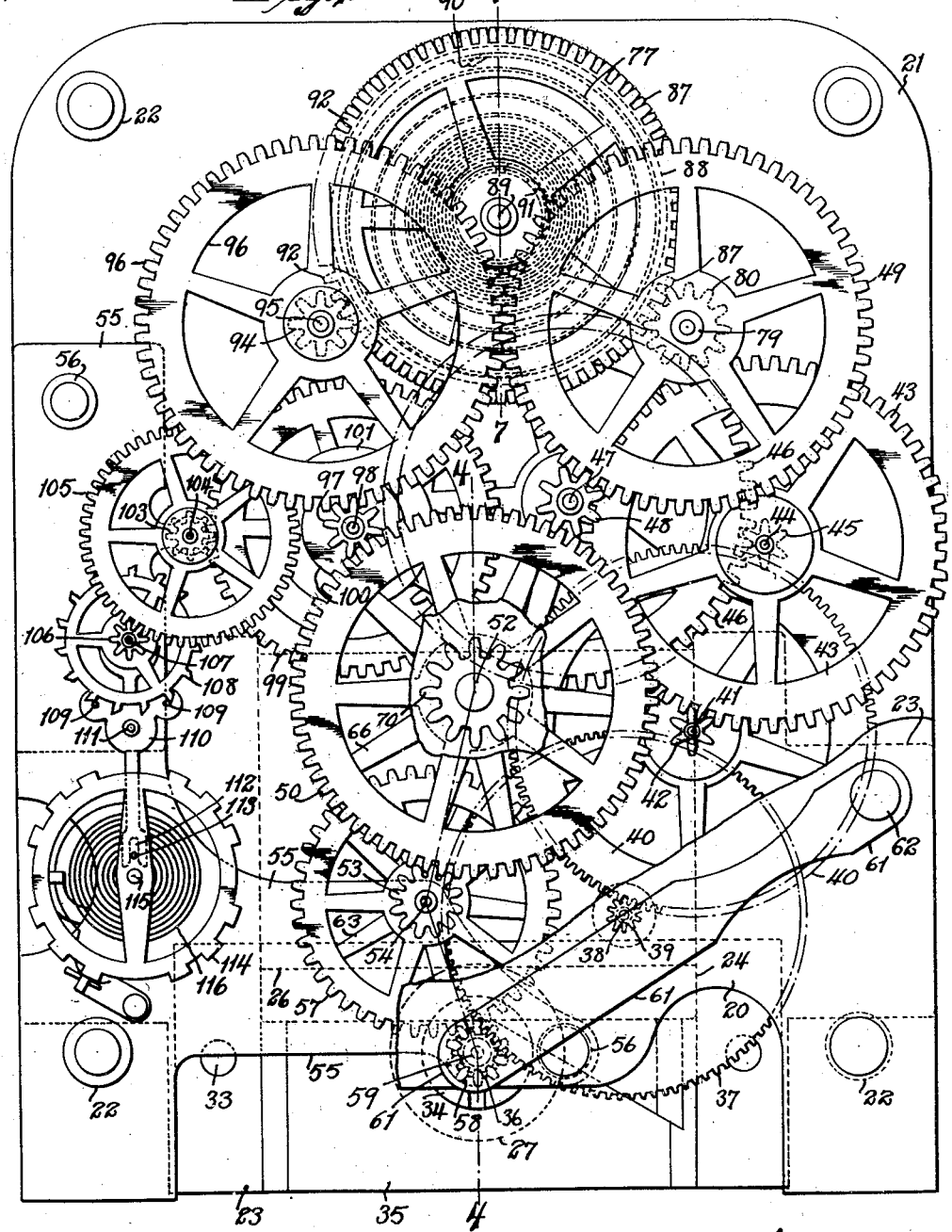
Fig. 1 is a view in front elevation of one form which a sustaining-power synchronous electric clock may assume in accordance with my invention, the major portion of the front movement-plate being broken away to expose the gear-trains, etc.
Figure 2:
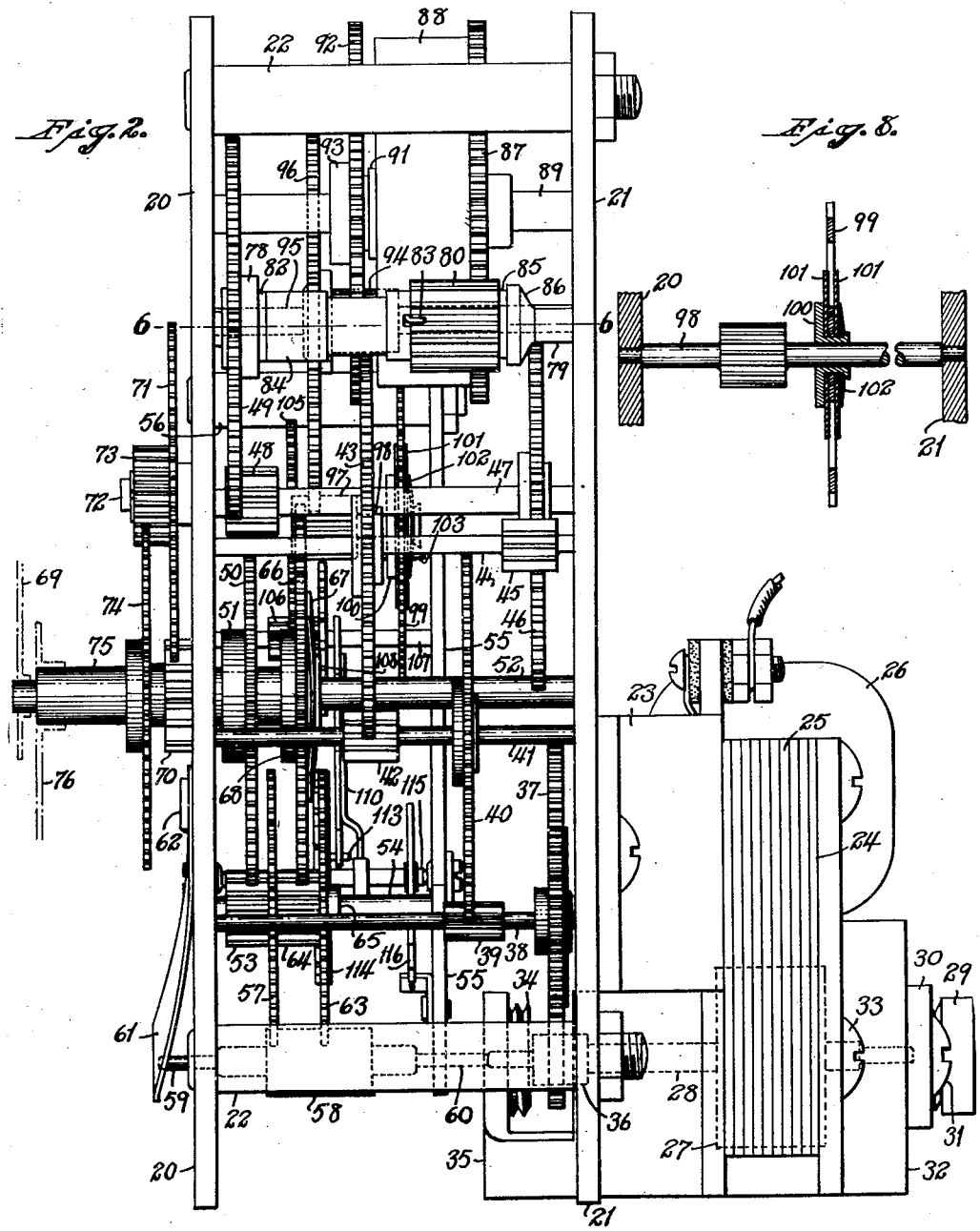
Fig. 2 is a view thereof in side or edge elevation.

The particular sustaining-power synchronous electric clock herein chosen for illustration, as an example of one form which my invention may assume, consists in the main of front and rear movement-plates 20 and 21 respectively, coupled together in spaced relationship by four (more or less) pillars 22.

Secured to the rear face of the rear movement-plate 21 by means of a struck-up sheet-metal frame-plate 23 is a synchronous electric motor, generally designated by the numeral 24 and which may be of any approved type, requiring no detailed description herein other than to say that it is preferably of the self-starting synchronous type and includes a laminated stator-structure 25 mounting an energizing coil 26 and acting in the usual manner upon a rotor 27 mounted upon a rotor-shaft 28.

Figure 3:
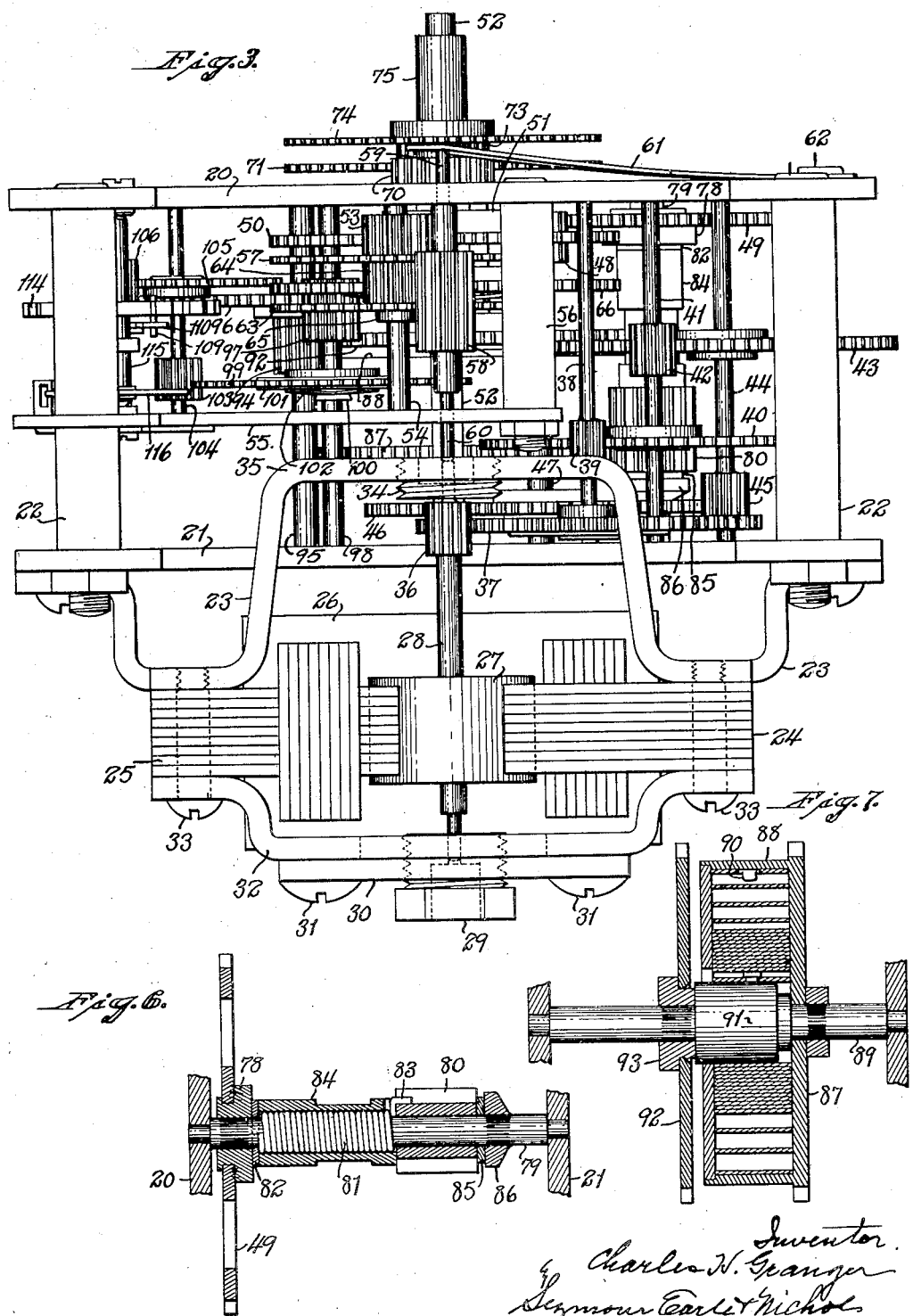
Fig. 3 is an under-side view thereof.

The rotor-shaft 28 just above referred to is supported for rotary and axial movement at its rear end in a cup-shaped bearing-screw 29 threaded into a rectangular bridge-plate 30 secured, by screws 31—31, to the rear face of a rearwardly-offset bracket 32, through the respective opposite ends of which screws 33—33 extend, and also through the laminated field-structure 25 and into the frame-plate 23, as clearly shown in Fig. 3 of the drawings.

At its forward end, the rotor-shaft 28 is similarly supported for both rotary and axial movement in a cup-shaped bearing-screw 34 threaded into the forwardly-offset transverse reach 35 of the frame-plate 23, before referred to.

Adjacent its forward end, the rotor-shaft 28 is supplied with a pinion 36, meshing into and driving a gear-wheel 37 staked or otherwise secured to an arbor 38 bearing in the front and rear movement-plates 20 and 21 respectively, and carrying in turn a pinion 39. The pinion 39 meshes into and drives a gear-wheel 40 staked or otherwise secured to an arbor 41 bearing in the movement-plates 20 and 21 and carrying a pinion 42 which meshes into and drives a gear-wheel 43. The gear-wheel 43 is staked upon an arbor 44 journaled in the front and rear movement-plates and carrying its rear end, a pinion 45 meshing into and driving a gear-wheel 46.

The gear-wheel 46 just referred to is staked or otherwise secured to and located adjacent the rear end of an arbor 47, which latter is provided adjacent its forward end with a pinion 48 meshing into and driving a winding-wheel 49 and a gear-wheel 50. The winding-wheel 49, just referred to, forms a feature of the means for winding an energy-storing driving-spring and will be left for later comment.

The gear-wheel 50 above referred to is staked upon a hub 51, which latter is mounted upon the center or minute arbor 52 of the clock with capacity for free relative rotation with respect thereto. The said gear-wheel 50 in turn meshes into and drives a pinion 53 staked upon an arbor 54 journaled at its forward end in the front movement-plate 20 and at its rear end in an L-shaped intermediate movement-plate 55 coupled to the said movement-plate 20 by means of a suitable number of pillars 56.

The pinion 53 just referred to has staked to its rear end a coupling-wheel 57 normally meshed into by an axially-shiftable coupling-pinion 58 provided at its respective opposite ends with relatively-long trunnions 59 and 60 journaled in the front movement-plate 20 and in the intermediate movement-plate 55.

The trunnion 60 of the coupling-pinion 58 abuts against the forward end of the rotor-arbor 28 and is normally held in engagement therewith by a sheet-metal spring 61 bearing at its free end against the outer end of the trunnion 59 and at its opposite end secured to the forward face of the front movement-plate by a rivet 62 or other suitable means.

Figure 4:
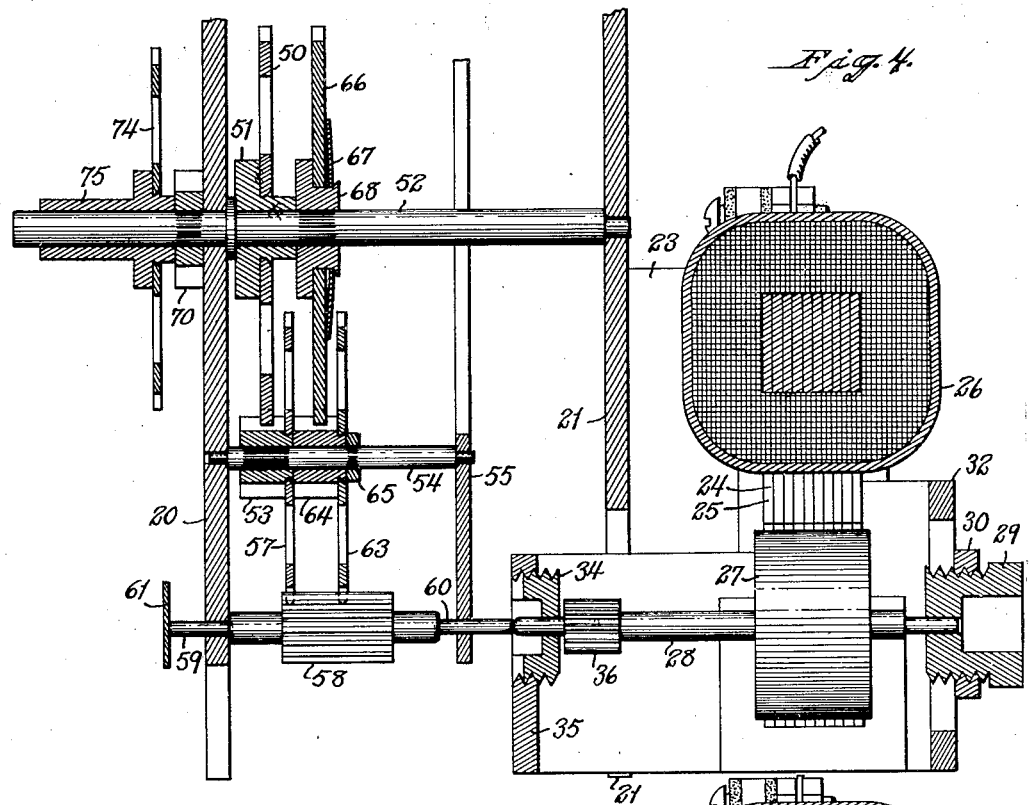
Fig. 4 is a broken transverse sectional view taken on the line 4—4 of Fig. 1.
Figure 5:
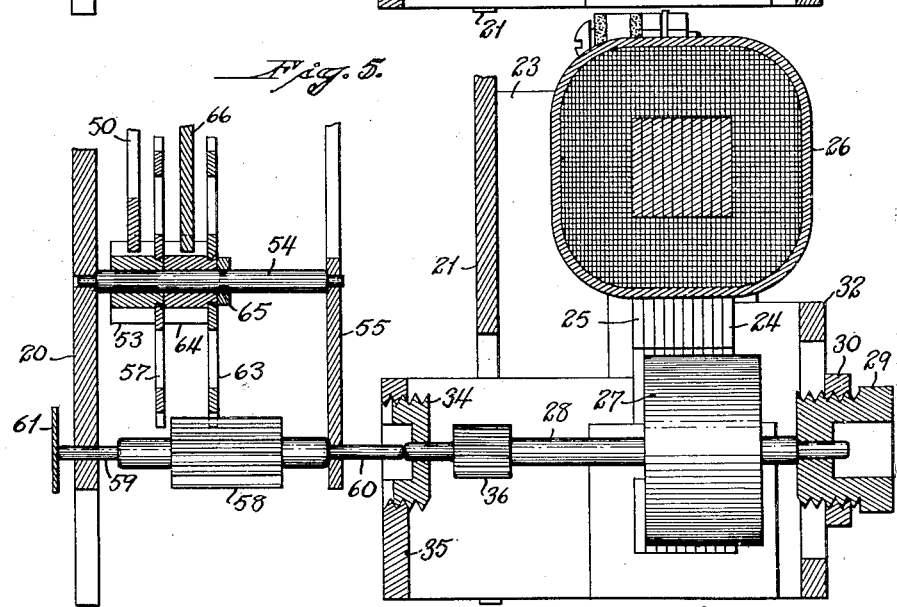
Fig. 5 is a similar but less comprehensive view showing the positions which the parts assume when the current supply to the motor fails.

The coupling-pinion 58 also meshes into a coupling-wheel 63 complementing the coupling-weel 57 before referred to and coaxially arranged with respect thereto, as clearly shown in Figs. 4 and 5. The said coupling-wheel 63 is rigidly mounted upon the rear end of a pinion 64 mounted upon the arbor 54 but with freedom for relative rotation with respect thereto, being retained in place by a collar 65 staked upon the said arbor 54 immediately to the rear of the pinion 64 aforesaid.

The pinion 64 meshes into and drives a minute-wheel 66 frictionally mounted by means of a cup-shaped spring 67 upon a hub 68 staked upon the center or minute-arbor 52 before referred to.

The chain of gear-wheels and pinions previously described, save for the winding-wheel 49, constitutes what may be termed a "synchronous train" leading from the rotor 27 to the minute-wheel 66 for effecting the turning thereof and the consequent turning of the center-arbor 52, before referred to, and associated parts.

The center- or minute-arbor 52 is journaled in the front and rear movement-plates 20 and 21 and projects forwardly through the former and is provided at its extreme forward end with the usual minute-hand 69. Just forward of the movement-plate 20 the arbor 52 has staked to it a so-called "cannon-pinion" 70 meshing into and driving a dial-wheel 71 mounted upon a stud 72 forwardly extending from the said movement-plate 20. Secured to the dial-wheel 71 is a dial-pinion 73 meshing into and driving an hour-wheel 74 secured to the rear end of an hour-sleeve 75 mounted upon the forwardly-projecting end of the minute-arbor 52 with freedom for rotation with respect thereto and carrying at its forward end the usual hour-hand 76.

When the motor 24 is energized, the rotor 27 thereof will act to synchronously drive or otherwise synchronously control the minute- and hour-hands 69 and 76 respectively through the train of parts already described and will, at the same time, serve to maintain an energy-storing driving-spring 77 under tension, so that in the event of a current interruption, the same may act to propel the said minute- and hour-hands or such other timing-element as may be desired.

The winding of the spring 77 just above referred to is effected by the motor through the intermediary of the train of parts leading up to the pinion 48, which latter serves to turn the winding-wheel 49, previously referred to and which is staked upon a hub 78 in turn staked upon an arbor 79 journaled at its respective opposite ends in the front and rear movement-plates 20 and 21.

Mounted upon the arbor 79 adjacent the rear end thereof and with capacity for relative rotary movement with respect thereto is a pinion 80 frictionally coupled to the said arbor and the said hub 78 of the winding-wheel 49 by means of a helical spring 81 encircling the arbor intermediate the said hub 78 and pinion 80 and bearing at its forward end against a friction-washer 82 and at its rear end provided with a hooked portion 83 entered between two of the adjacent teeth of the pinion 80.

The spring 81 is housed within a sleeve 84 and exerts a constant endwise tension tending to force the pinion 80 rearward into engagement with a friction-washer 85 which, in turn, seats against a collar 86 staked upon the arbor 79 adjacent the rear end thereof, as clearly shown in Fig. 6.

The spring 81 just above described serves as a yielding coupling between the winding-wheel 49 and the pinion 80 and hence also serves as a yielding coupling between the said winding-wheel and the spring 77, as will hereinafter appear. The object of the frictional connection is to permit slippage of the parts when the spring 77 has been wound to a predetermined degree so as to avoid the overloading of the motor and the possible stalling thereof.

The pinion 80 meshes into and turns a main winding-wheel 87 carrying a spring-barrel 88 and loosely mounted with freedom for relative rotation upon a so-called "main-arbor" 89 which is journaled at its respective opposite ends in the front and rear movement-plates 20 and 21.

The spring 77 has its outer end attached to the spring-barrel 88 by being hooked over an inwardly-turned finger 90 struck inwardly from the periphery of the said barrel. The inner end of the spring 77 is coupled to an enlarged portion 91 of the arbor 89 and serves to turn the same and also a so-called "main-wheel" 92 staked upon a hub 93 in turn staked upon the said arbor 89.

The main-wheel 92 meshes into and drives a first pinion 94 carried by a second arbor 95 also having staked to it a second wheel 96 meshing into and driving a second pinion 97 carried by a third arbor 98 journaled at its respective opposite ends in the front and rear movement-plates 20 and 21. The second pinion 97 just referred to also meshes into and serves to drive the minute-wheel 66 when the current supply to the motor 24 fails, as will hereinafter appear, and also serves to couple the spring-driven train now being described to the synchronous train already described, inasmuch as the said minute-wheel 66 is normally driven also by the motor 24 acting through the pinion 64.

Now since the spring 77 must serve to drive the clock when the motor fails, due to a failure in the current supply thereto, I provide an escapement-mechanism for governing the driving action of the said spring or other energy-storing motor and cause the same to drive the clock in substantial accordance with correct time.

For the purpose just referred to, the third arbor 98 carrying the second pinion 97 has also frictionally secured to it a third wheel 99. The said wheel 99 is frictionally coupled to the said third arbor 98 for being driven thereby by means of a hub 100 staked upon the said arbor and upon which the said wheel 99 is mounted between a pair of friction-washers 101—101 and clamped therebetween by a spring-washer 102, all as clearly shown in Fig. 8.

The third wheel 99 meshes into and drives a third pinion 103 carried by a fourth arbor 104 journaled at its respective opposite ends in the plates 20 and 55. The arbor 104 also has staked to it a fourth wheel 105 meshing into and driving a fourth pinion 106 carried by an escape-wheel arbor 107 journaled at its respective opposite ends in the movement-plates 20 and 55 and mounting the usual escape-wheel 108.

The escape-wheel 108 coacts in the usual way with the complementary pins 109 of an escape-lever 110 mounted upon an arbor 111 also journaled between the plates 20 and 55 before referred to. At its end opposite the escape-wheel 108, the escape-lever 110 is forked as at 112 for cooperation with an impulse-pin 113 extending rearwardly from a balance-wheel 114 mounted upon a balance-staff 115 journaled between the plates 20 and 55 aforesaid. In connection with the balance-staff and balance-wheel a usual hair-spring 116 is employed, as shown in Fig. 1.

When the energizing-coil 26 of the synchronous motor 24 is supplied with current, the rotor 27 will be drawn axially forward by the magnetic pull of the field-structure 25 from the position in which it is shown in Fig. 5 to the position in which it is shown in Fig. 4, in which it will correspondingly move the coupling-pinion 58 forward so as to mesh the same with the coupling-wheel 57 and so effect the coupling of the gear 50 (which latter is being constantly driven by the rotor) with the minute-wheel 66 and hence with the minute- and hour-hands 69 and 76 respectively.

When the motor 24 is driving the clock, it also serves as before described to wind the spring 77 and also, owing to the meshing in of the second pinion 97 with the minute-wheel 66, the said motor will compel, so to speak, the escapement-mechanism to operate in synchronism, should the same have any tendency to operate otherwise at this time. The friction-coupling between the third arbor 98 and the third wheel 99, as before described, and as particularly shown in Fig. 8, will serve, however, to permit some slippage and prevent any harmful effects upon the escapement-mechanism, should the timing thereof be markedly inaccurate for any reason.

From the foregoing, it will be seen that should the spring 77, acting under the restraint of the escapement-mechanism, tend to drive the hands too rapidly, the synchronous motor will restrain this tendency and compel the said hands or other time-element to move synchronously. If on the other hand, the said spring 77 or other energy-storing motor tends to drive the hands too slowly, then the synchronous motor will act to speed up the said hands and actually drive the same synchronously. Therefore, the function of the synchronous motor may be said to be a "governing" function.

Immediately upon the failure of a proper supply of current to the motor 24, the spring 61 will assert itself and move both the coupling-pinion 58 and rotor 27 rearwardly, with the effect of disengaging (Fig. 5) the said pinion 58 from the coupling-wheel 57 to thus permit the driving-spring 77 to actively drive the minute-wheel 66 and the parts driven thereby without subjecting the said spring to the burden of also turning the rotor 27.

It may be here noted that the frictional coupling of the minute-wheel 66 with the center-arbor 52 serves to permit the hands of the clock to be moved for the purpose of resetting them without also requiring the turning of the rotor, etc.

From the foregoing it will be seen that upon an interruption of the current-supply to the synchronous motor, the spring-driven train will automatically assume the burden of driving the hands of the clock at approximately correct time and that automatically upon the resumption of the current-supply to the motor, the same will promptly resume its function of synchronously controlling the said hands and at the same time keep the escapement-mechanism operating so that the same may not become impaired through disuse.

The particular clock-movement herein chosen for illustration is designed to propel clock-hands for the visual indication of time but I wish to have it understood that my invention is not limited to the visual indication of time, since the hands may be replaced by any time-element such, for instance, as a timing-disk for operating or controlling a time-switch mechanism without in any material way affecting the supplemental action of the spring-train, etc. The element (or elements) which it is desired to drive may, therefore, be properly termed "time-element," inasmuch as such element would discharge a time function. It will be understood by those skilled in the art that the present invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. In a sustaining-power synchronous electric time-instrument, the combination with a driven time-element; of an energy-storing motor constructed and arranged for driving the said time-element; a synchronous electric motor normally controlling the said time-element and including an axially-movable rotor automatically controlled in such movement by the magnetism of the said motor; and coupling-means controlled by the axial movement of the said rotor for automatically disconnecting the same from the said time-element to relieve the said energy-storing motor of restraint by the said rotor when the current supply to the said synchronous electric motor fails.

2. In a sustaining-power synchronous electric time-instrument, the combination with a driven time-element; of an energy-storing motor constructed and arranged for driving the said time-element; a synchronous electric motor constructed and arranged for normally controlling the said time-element and including an axially-movable rotor automatically controlled in such movement by the magnetism of the said motor; and coupling-means controlled by the axial movement of the said rotor for coupling and uncoupling the output-side of the said energy-storing motor and the said rotor.

3. In a sustaining-power synchronous electric time-instrument, the combination with a driven time-element; of a driving-spring constructed and arranged for driving the said time-element; a synchronous electric motor normally controlling the said time-element and including an axially-movable rotor automatically controlled in such movement by the magnetism of the said motor; and coupling-means controlled by the axial movement of the said rotor for automatically disconnecting the same from the said time-element to relieve the said driving-spring of restraint by the said rotor when the current-supply to the said synchronous electric motor fails.

4. In a sustaining-power synchronous electric time-instrument, the combination with a driven time-element; of a driving-spring constructed and arranged for driving the said time-element; a synchronous electric motor constructed and arranged for normally controlling the said time-element and including an axially-movable rotor automatically controlled in such movement by the magnetism of the said motor; and coupling-means controlled by the automatic axial movement of the said rotor for coupling and uncoupling the output-side of the said driving-spring and the said rotor.

5. In a sustaining-power synchronous electric time-instrument, the combination with a driven time-element; of an energy-storing motor constructed and arranged for driving the said time-element; a synchronous electric motor constructed and arranged to normally control the said time-element and including an axially-movable rotor automatically controlled in such movement by the magnetism of the said motor and operatively connected to the input-side of the said energy-storing motor for energizing the same; and coupling-means controlled by the automatic axial movement of the said rotor for coupling and uncoupling the output-side of the said energy-storing motor and the said rotor.

6. In a sustaining-power synchronous electric time-instrument, the combination with a driven time-element; of an energy-storing motor constructed and arranged for driving the said time-element; a synchronous electric motor constructed and arranged to normally control the said time-element and including an axially-movable rotor automatically controlled in such movement by the magnetism of the said motor; a yielding frictional connection between the said rotor and the input-side of the said energy-storing motor for energizing the same; and coupling-means controlled by the automatic axial movement of the said rotor for coupling and uncoupling the output-side of the said energy-storing motor and the said rotor.

7. In a sustaining-power synchronous electric time-instrument, the combination with a driven time-element; of a driving-spring constructed and arranged for driving the said time-element; a synchronous electric motor constructed and arranged to normally control the said time-element and including an axially-movable rotor automatically controlled in such movement by the magnetism of the said motor and operatively connected to the input-side of the said driving-spring for tensioning the same; and coupling-means controlled by the automatic axial movement of the said rotor for automatically coupling and uncoupling the output-side of the said driving-spring and the said rotor.

8. In a sustaining-power synchronous electric time-instrument, the combination with a driven time-element; of a driving-spring constructed and arranged for driving the said time-element; a synchronous electric motor constructed and arranged to normally control the said time-element and including an axially-movable rotor automatically controlled in such movement by the magnetism of the said motor, a yielding frictional driving-connection between the said rotor and the said driving-spring for energizing the same; and coupling-means controlled by the automatic axial movement of the said rotor for automatically coupling and uncoupling the output-side of the said driving-spring and the said rotor.

9. In a sustaining-power synchronous electric time-instrument, the combination with a driven time-element; of an energy-storing motor; a time-train operatively connecting the output-side of the energy-storing motor to the said time-element for driving the same; a synchronous electric motor including an axially-movable rotor automatically controlled in such movement by the magnetism of the said motor; a synchronous train operatively connecting the said rotor to the said time-element; and coupling-means controlled by the automatic axial movement of the said rotor for automatically disconnecting the said synchronous train from the said time-train to permit the latter to operate the said time-element unhindered by the said rotor.

10. In a sustaining-power synchronous electric time-instrument, the combination with a driven time-element; of a driving-spring; a spring-driven train operatively connecting the output-side of the said driving-spring to the said time-element for driving the same; a synchronous electric motor including an axially-movable rotor automatically controlled in such movement by the magnetism of the said motor and operatively connected to the input-side of the said driving-spring for tensioning the same; a synchronous train operatively connecting the said rotor to the said time-element; and coupling-means controlled by the automatic axial movement of the said rotor for automatically disconnecting the said synchronous train from the said spring-driven train to permit the latter to operate the said time-element unhindered by the rotor.

11. In a sustaining-power synchronous electric time-instrument, the combination with a driven time-element; of an energy-storing motor constructed and arranged for driving the said time-element; a synchronous electric motor normally controlling the said time-element and including a stator and an axially-movable rotor; and coupling-means for coupling and uncoupling the said time-element and the said rotor and movable into its coupling position by an axial movement of the said rotor occasioned by the supplying of electrical energy to the stator of the said synchronous electric motor.

12. In a sustaining-power synchronous electric time-instrument, the combination with a driven time-element; of an energy-storing motor constructed and arranged for driving the said time-element; a synchronous electric motor normally controlling the said time-element and including a stator and an axially-movable rotor; coupling-means for coupling and uncoupling the said time-element and the said rotor and movable into its coupling position by an axial movement of the said rotor occasioned by the supplying of electrical energy to the stator of the said synchronous electric motor; and yielding-means constructed and arranged to exert a constant effort to move the said coupling-means into its uncoupling position.

13. In a sustaining-power synchronous electric time-instrument, the combination with a driven time-element; of an energy-storing motor; a timing-train for operatively connecting the output-side of the said energy-storing motor to the said time-element for driving the same; a synchronous electric motor; a synchronous train operatively connecting the said synchronous motor to the said timing-train to normally control the same; and automatic coupling-means controlled by the magnetism of the said motor and constructed and arranged to normally interconnect the said timing-train and the said synchronous train to cause the former to normally operate in consonance with the said synchronous train.

14. In a sustaining-power synchronous electric time-instrument, the combination with a driven time-element; of a synchronous electric motor having a rotor for controlling the said time-element and constructed and arranged to impart both rotary and axial movement to the said rotor by the action of the magnetism developed in the motor-structure; and releasable coupling-means interposed between the said rotor and the said time-element for transmitting the movement of the former to the latter and controlled by the magnetism of the said motor acting through the axial movement of the said rotor.

15. In a sustaining-power synchronous electric time-instrument, the combination with a driven time-element; of a synchronous electric motor having a rotor for controlling the said time-element and constructed and arranged to impart both rotary and axial movement to the said rotor by the action of the magnetism developed in the motor-structure; releasable coupling-means interposed between the said rotor and the said time-element for transmitting the movement of the former to the latter and moved into its coupling position by the magnetism of the said motor acting through the axial movement of the said rotor; and spring-means normally urging the said releasable coupling-means into its uncoupling position.

CHARLES H. GRANGER.

DISCLAIMER 1,926,806.—*Charles H. Granger*, Waterbury, Conn. SUSTAINING-POWER SYNCHRONOUS ELECTRIC CLOCK. Patent dated September 12, 1933. Disclaimer filed September 23, 1935, by the patentee and the assignee, *The Waterbury Clock Company*.

Hereby disclaim claim 13 of the said patent.

[*Official Gazette October 15, 1935.*]